(12) United States Patent
Song et al.

(10) Patent No.: US 12,524,913 B2
(45) Date of Patent: Jan. 13, 2026

(54) VIRUS DETECTION METHOD USING COLOR CHANGE OF VIRUS DETECTOR

(71) Applicant: GIST (Gwangju Institute of Science and Technology), Gwangju (KR)

(72) Inventors: Young Min Song, Gwangju (KR); Joo Hwan Ko, Gwangju (KR); Young Jin Yoo, Gwangju (KR)

(73) Assignee: GIST (Gwangju Institute of Science and Technology), Gwangju (KR)

( * ) Notice: Subject to any disclaimer, the term of this patent is extended or adjusted under 35 U.S.C. 154(b) by 415 days.

(21) Appl. No.: 18/160,067

(22) Filed: Jan. 26, 2023

(65) Prior Publication Data
US 2023/0419547 A1    Dec. 28, 2023

(30) Foreign Application Priority Data
Jun. 23, 2022    (KR) .................. 10-2022-0076683

(51) Int. Cl.
*G06T 7/90* (2017.01)
*G01N 33/569* (2006.01)
*G06T 7/00* (2017.01)

(52) U.S. Cl.
CPC .......... *G06T 7/90* (2017.01); *G01N 33/56983* (2013.01); *G06T 7/0012* (2013.01); *G06T 2207/10024* (2013.01)

(58) Field of Classification Search
CPC ............. G06T 7/90; G06T 7/0012; G06T 2207/10024; G01N 33/56983; G01N 21/78; G01N 33/52; G01N 33/5375; G01N 2021/1776; G01N 2333/005
USPC ............................................. 382/165
See application file for complete search history.

(56) References Cited

U.S. PATENT DOCUMENTS

2012/0106822 A1 * 5/2012 Mimura .............. C12M 41/48
                                                                382/133

FOREIGN PATENT DOCUMENTS

JP    2016028607 A  *  3/2016  .......... G06V 20/698
KR    101352876 B1  *  1/2014  .......... G01N 21/78

* cited by examiner

*Primary Examiner* — Jennifer Mehmood
*Assistant Examiner* — Dustin Bilodeau
(74) *Attorney, Agent, or Firm* — Studebaker Brackett PLLC (57) ABSTRACT

The present disclosure relates to a virus detection method that detects whether viruses are arranged in multiple layers and the density of viruses using a color change of a virus detector. A virus detection method according to an embodiment of the present disclosure includes: taking an image of a virus detector reacting with a target analysis object; and determining whether viruses are arranged in multiple layers and density of the viruses in the target analysis object in accordance with a saturation value of the image.

9 Claims, 9 Drawing Sheets
(6 of 9 Drawing Sheet(s) Filed in Color)

VIRUS DETECTION METHOD USING COLOR CHANGE OF VIRUS DETECTOR

CROSS REFERENCE TO RELATED APPLICATION

The present application claims priority to Korean Patent Application No. 10-2022-0076683, filed Jun. 23, 2022, the entire contents of which is incorporated herein for all purposes by this reference.

BACKGROUND OF THE INVENTION

Field of the Invention

The present disclosure relates to a virus detection method that detects whether viruses are arranged in multiple layers and the density of viruses using a color change of a virus detector.

Description of the Related Art

Viruses are considered as a critical threat in public health, particularly, to people with weak immunity such as infants and the old. It is impossible to prevent a fatal injury to patients unless starting appropriate treatment according to the degree of infection by quantifying the density of viruses before a virus load reaches a peak.

Methods of detecting viruses in the related art sense whether there is a virus by analyzing an electrochemical signal that is generated when a virus adheres to a sensor. However, these methods have limitation that the process of detecting viruses is not intuitional and they can sense whether there is a virus but cannot find out density of viruses.

Optical type sensors using a plasmonic effect were introduced to improve intuition of sensing viruses, but these sensors have a defect that they are difficult to manufacture because they have complicated nano structures and that specific optical analysis equipment is required for accurate sensing because optical variation is very small. In addition, there is also limitation that these types can detect only whether there is a virus but cannot find out density of viruses.

As described above, since most onsite diagnosis methods in the related art are not suitable for finding out the density of viruses, there is a need for a bioimaging technique for visualizing and quantifying biological samples.

SUMMARY OF THE INVENTION

An objective of the present disclosure is to detect a variation state and density of viruses included in a target analysis object using a color change of a virus detector reacting with the target analysis object.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

A virus detection method according to an embodiment of the present disclosure for achieving the objectives described above includes: taking an image of a virus detector reacting with a target analysis object; and determining whether viruses are arranged in multiple layers and density of the viruses in the target analysis object in accordance with a saturation value of the image.

In an embodiment, when the virus detector comes in contact with a virus, a color thereof changes through an antigen-antibody interaction.

In an embodiment, the virus detector includes: a reflective layer including metal; a resonant layer formed on the reflective layer; an antibody immobilization layer positioned on the resonant layer and immobilizing antibodies; and an antibody layer formed on the antibody immobilization layer.

In an embodiment, the taking an image of a virus detector includes taking the image by scanning the virus detector at each pixel.

In an embodiment, the virus detection method further includes creating an RGB color dataset of the virus detector according to density of viruses.

In an embodiment, the determining of whether viruses are arranged in multiple layers and density of the viruses includes: converting an RGB color value of the image into the saturation value; and determining whether the viruses are arranged in multiple layers and density of the viruses on the basis of the saturation value.

In an embodiment, the determining of whether viruses are arranged in multiple layers and density of the viruses includes: clustering pixels of which a color value or a saturation value is in a preset range of pixels constituting the image; and determining whether the viruses are arranged in multiple layers and density of the viruses on the basis of saturation values of the clustered pixels.

In an embodiment, the determining of whether viruses are arranged in multiple layers includes determining whether the viruses are arranged in multiple layers, depending on whether the saturation value is included in a plurality of reference ranges that do not overlap each other.

In an embodiment, the determining of whether viruses are arranged in multiple layers includes determining that the viruses are arranged in a monolayer when the saturation value is included in a first reference range, and determining that the viruses are arranged in multiple layers when the saturation value is included in the second reference value lower than the first reference value.

In an embodiment, the determining of density of viruses includes determining density of the viruses corresponding to the saturation value.

In an embodiment, the virus detection method further includes imaging an arrangement state and density of the viruses.

In an embodiment, the imaging of an arrangement state and density of the viruses includes creating an analysis image in which colors of pixels constituting the image are differently represented, depending on at least one whether the viruses are arranged in multiple layers and density of the viruses.

The present disclosure has an advantage that it is possible to not only intuitionally find out whether an examinee has been infected with viruses through a quick examination, but find only the degree of infection with the viruses by detecting the arrangement state and density of the viruses included in a target analysis object using color variation of a virus detector reacting with the target analysis object.

Detailed effects of the present disclosure in addition to the above effects will be described with the following detailed description for accomplishing the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings of this specification exemplify preferred embodiments and help easy understanding of the present invention together with the following detailed description, so the present invention should not be construed as being limited to the drawings.

DETAILED DESCRIPTION OF THE INVENTION

The objectives, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present disclosure will be described with reference to accompanying drawings. The same reference numerals are used to indicate the same or similar components in the drawings.

Although terms 'first', 'second', etc. are used to describe various components in the specification, it should be noted that these components are not limited by the terms. These terms are used to discriminate one component from another component and it is apparent that a first component may be a second component unless specifically stated otherwise.

Further, when a certain configuration is disposed "over (or under)" or "on (beneath)" of a component in the specification, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component in the specification, it should be understood that the components may be directly connected or jointed to each other, but another component may be "interposed" between the components or the components may be "connected", "coupled", or "jointed" through another component.

Further, singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

The present disclosure relates to a virus detection method that detects whether viruses are arranged in multiple layers and the density of viruses using a color change of a virus detector. Hereafter, a virus detection method according to an embodiment of the present disclosure is described in detail with reference to FIGS. 1 to 9.

Figure 1:
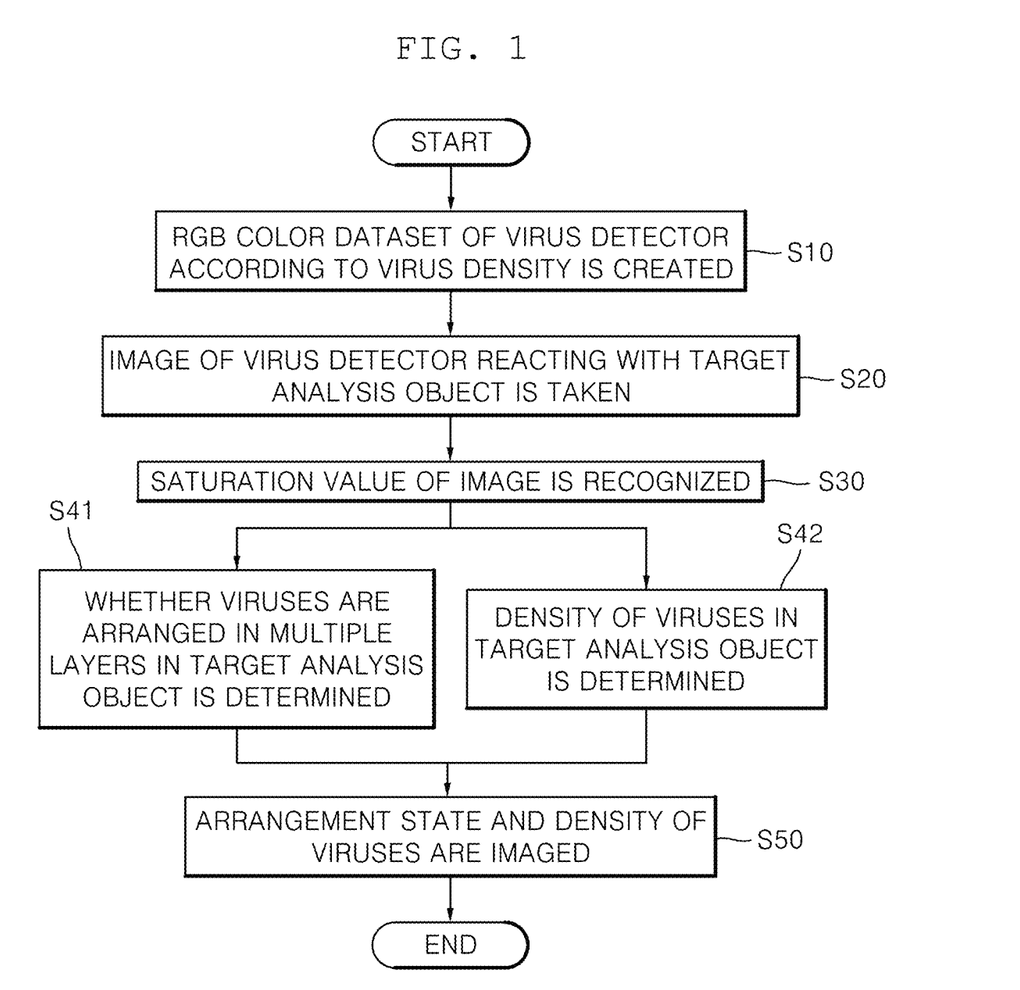
FIG. 1 is a flowchart of a virus detection method according to an embodiment of the present disclosure.
Figure 2:
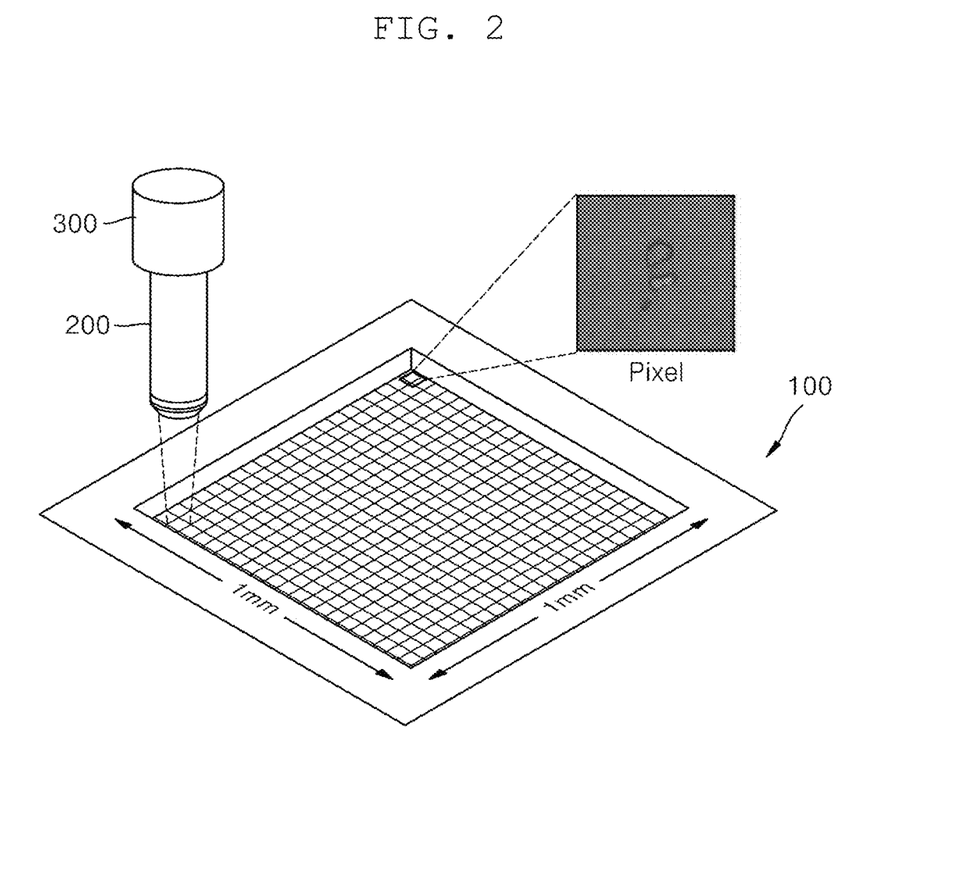
FIG. 2 is a view showing a virus detection system according to an embodiment of the present disclosure.

FIG. 1 is a flowchart of a virus detection method according to an embodiment of the present disclosure and FIG. 2 is a view showing a virus detection system according to an embodiment of the present disclosure.

Figure 3:
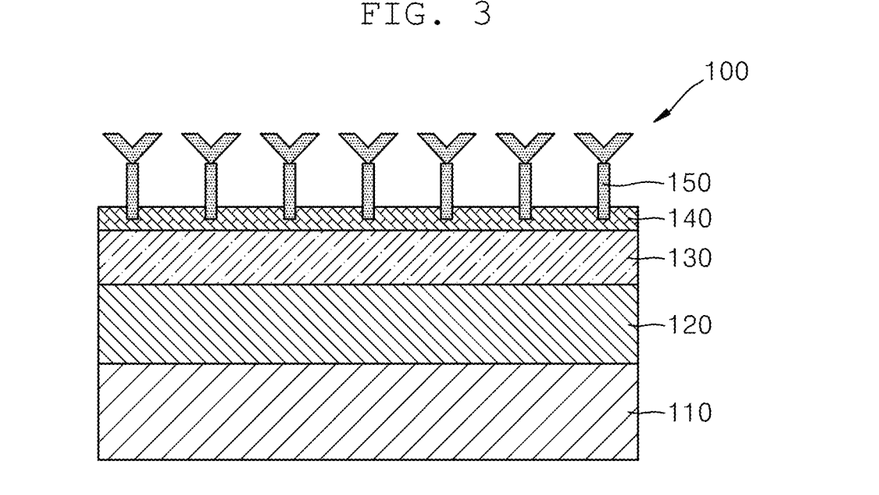
FIG. 3 is a view showing the structure of a virus detector according to an embodiment of the present disclosure.
Figure 4:
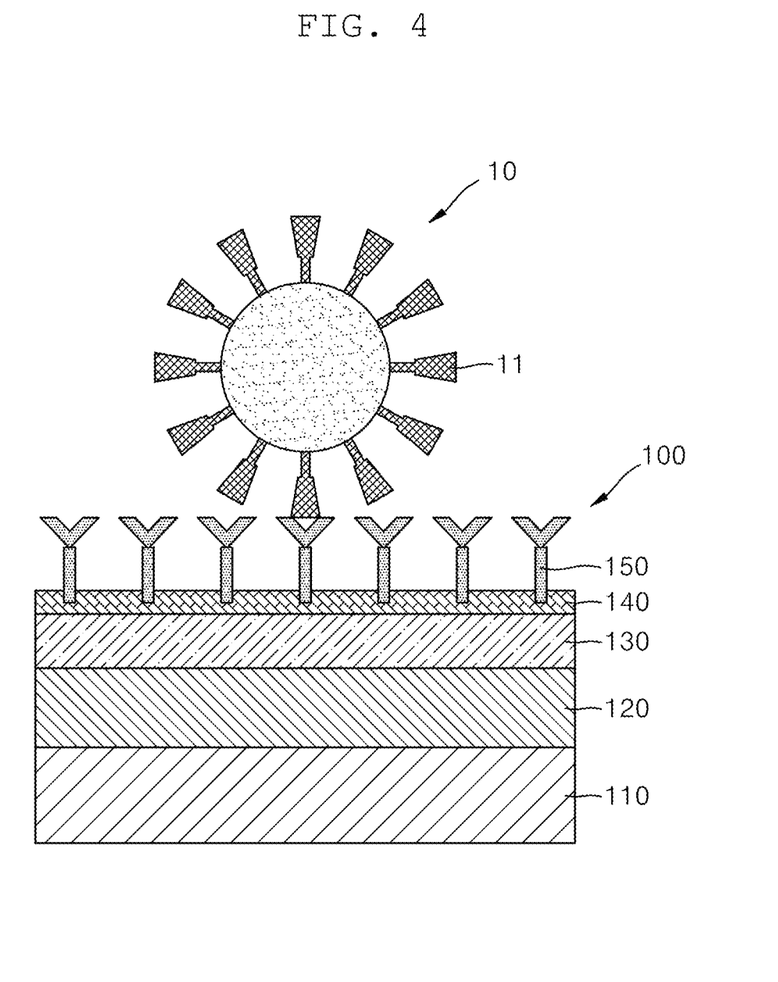
FIG. 4 is a view showing the state in which a virus has been adsorbed to the virus detector shown in FIG. 3.

FIG. 3 is a view showing the structure of a virus detector according to an embodiment of the present disclosure and FIG. 4 is a view showing the state in which a virus has been adsorbed to the virus detector shown in FIG. 3.

Figure 5:
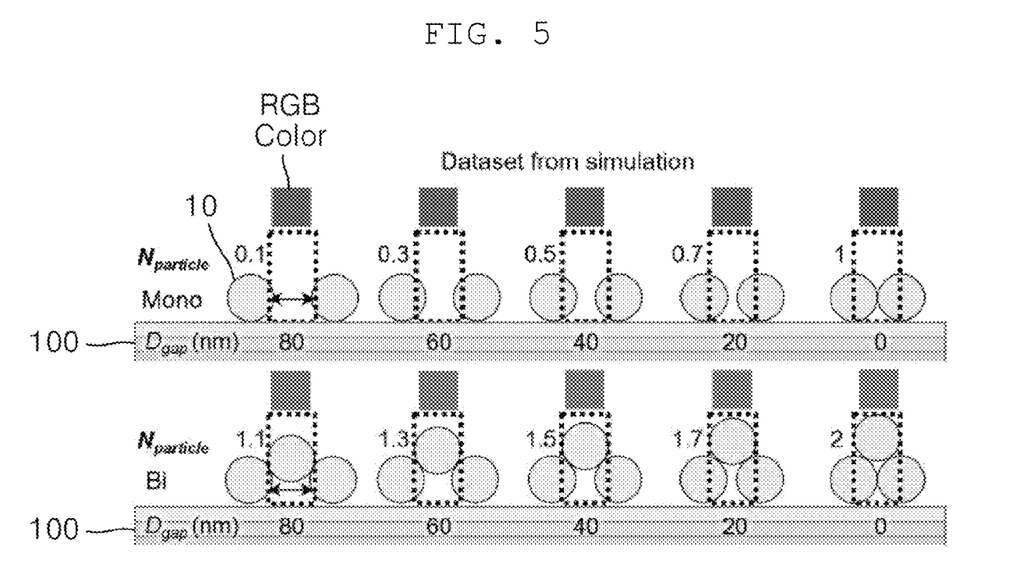
FIG. 5 is a view showing that a virus detectors shows different colors in accordance with whether viruses are arranged in multiple layers and density of viruses.

FIG. 5 is a view showing that a virus detectors shows different colors in accordance with whether viruses are arranged in multiple layers and density of viruses.

Figure 6:
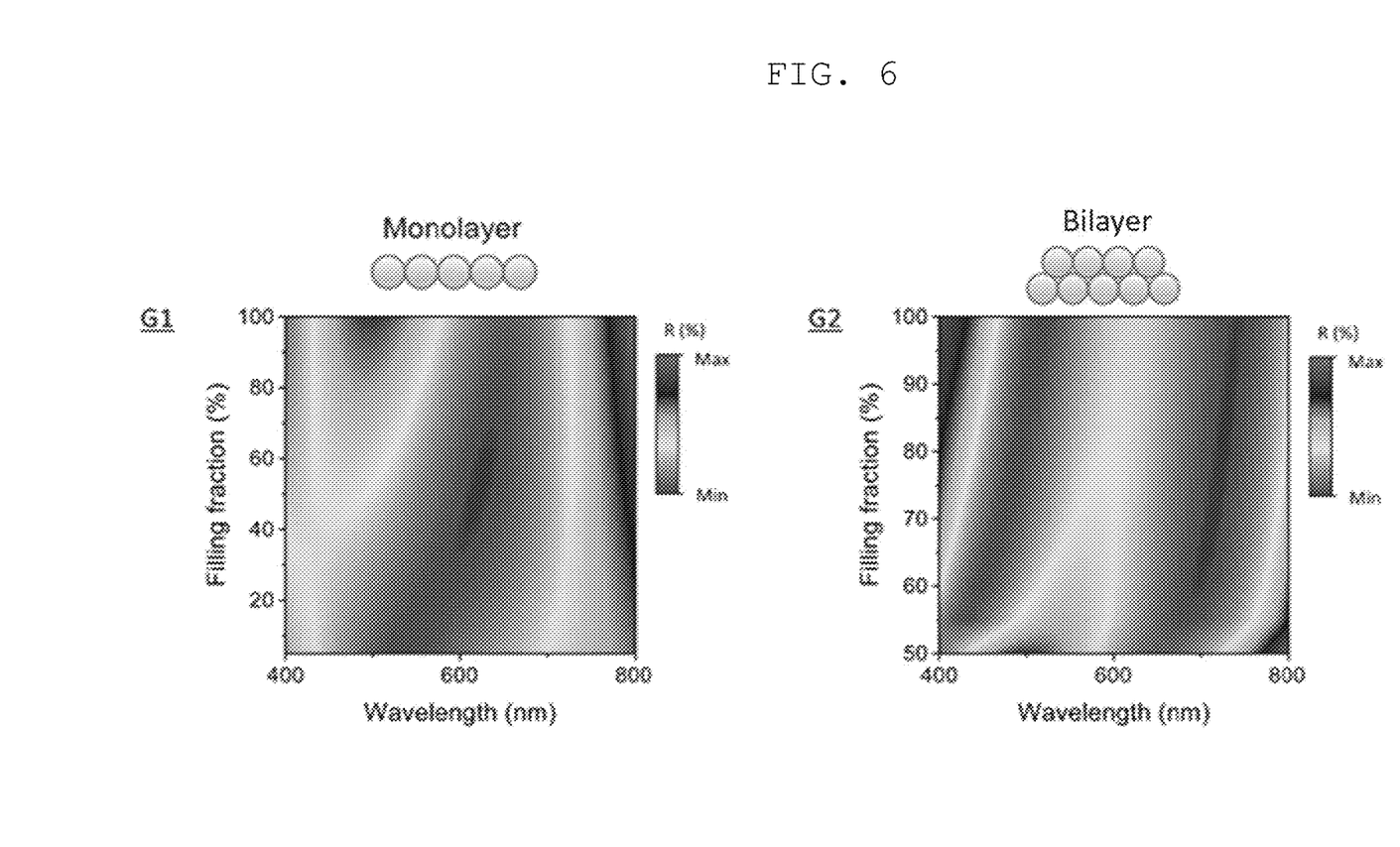
FIG. 6 is a view showing reflectivity at each wavelength of a virus detector when viruses are arranged in a monolayer or multiple layers on a virus detector.

FIG. 6 is a view showing reflectivity at each wavelength of a virus detector when viruses are arranged in a monolayer or multiple layers on a virus detector.

Figure 7:
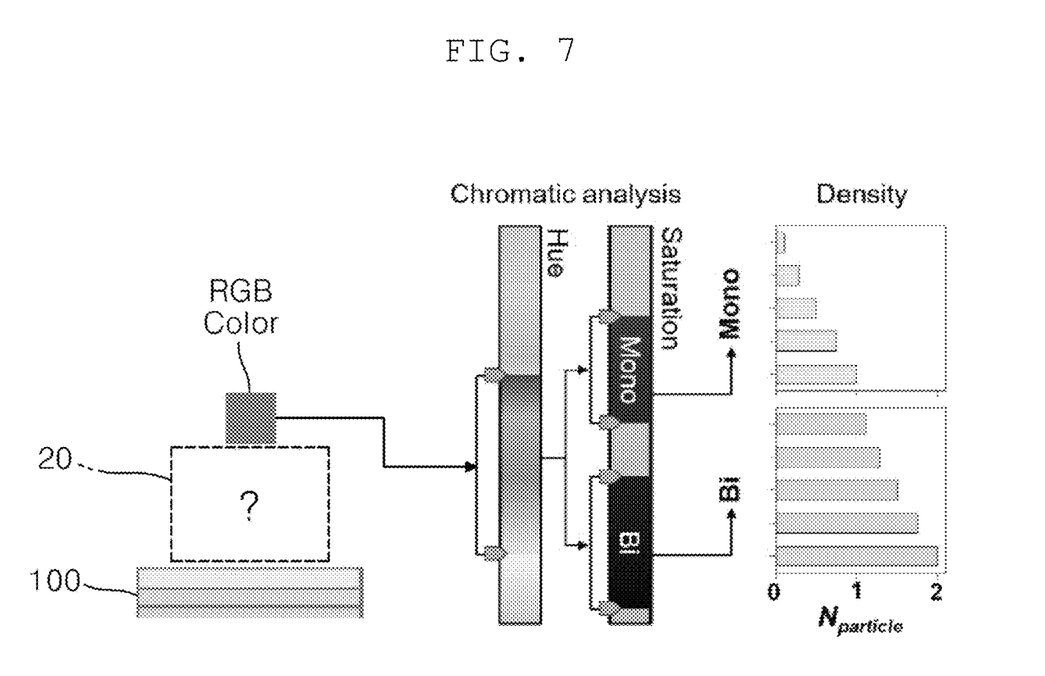
FIG. 7 is a view illustrating a process of determining density of a target analysis object in accordance with an image of the target analysis object.

FIG. 7 is a view illustrating a process of determining density of a target analysis object in accordance with an image of the target analysis object.

Figure 8:
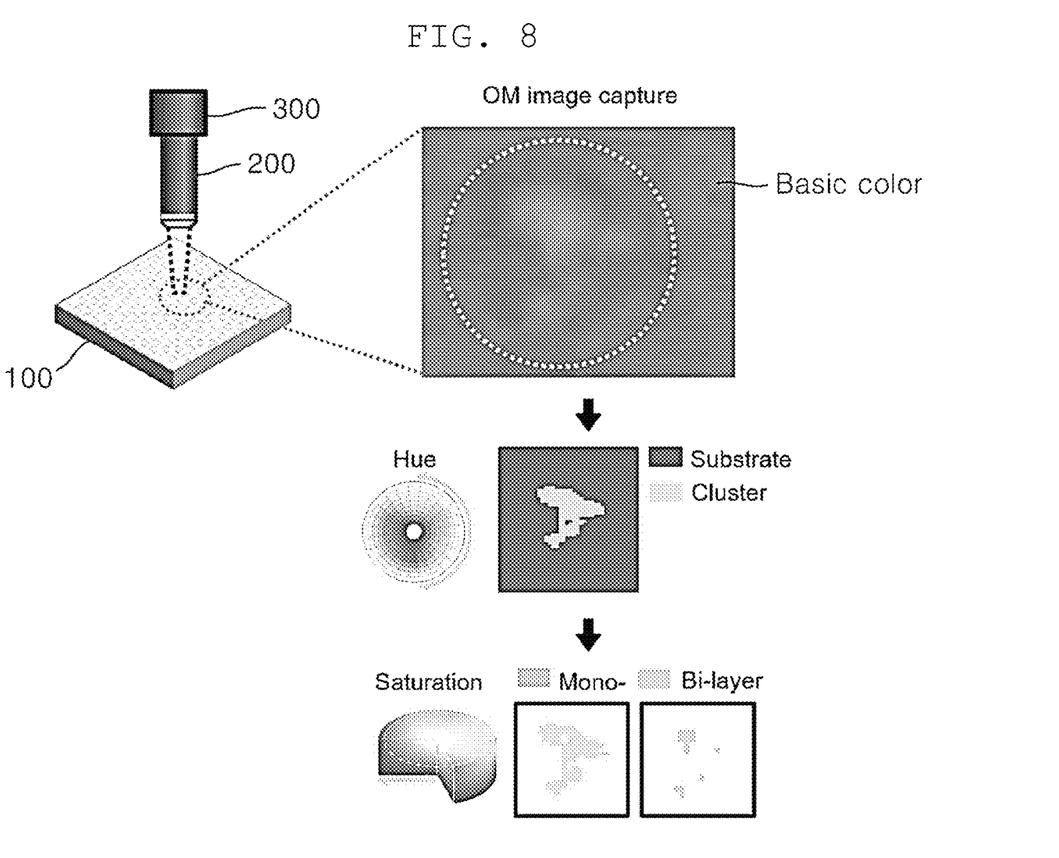
FIG. 8 is a view illustrating a process of determining whether there are multiple layers in a target analysis object and of imaging the arrangement in accordance with an image of the target analysis object.
Figure 9:
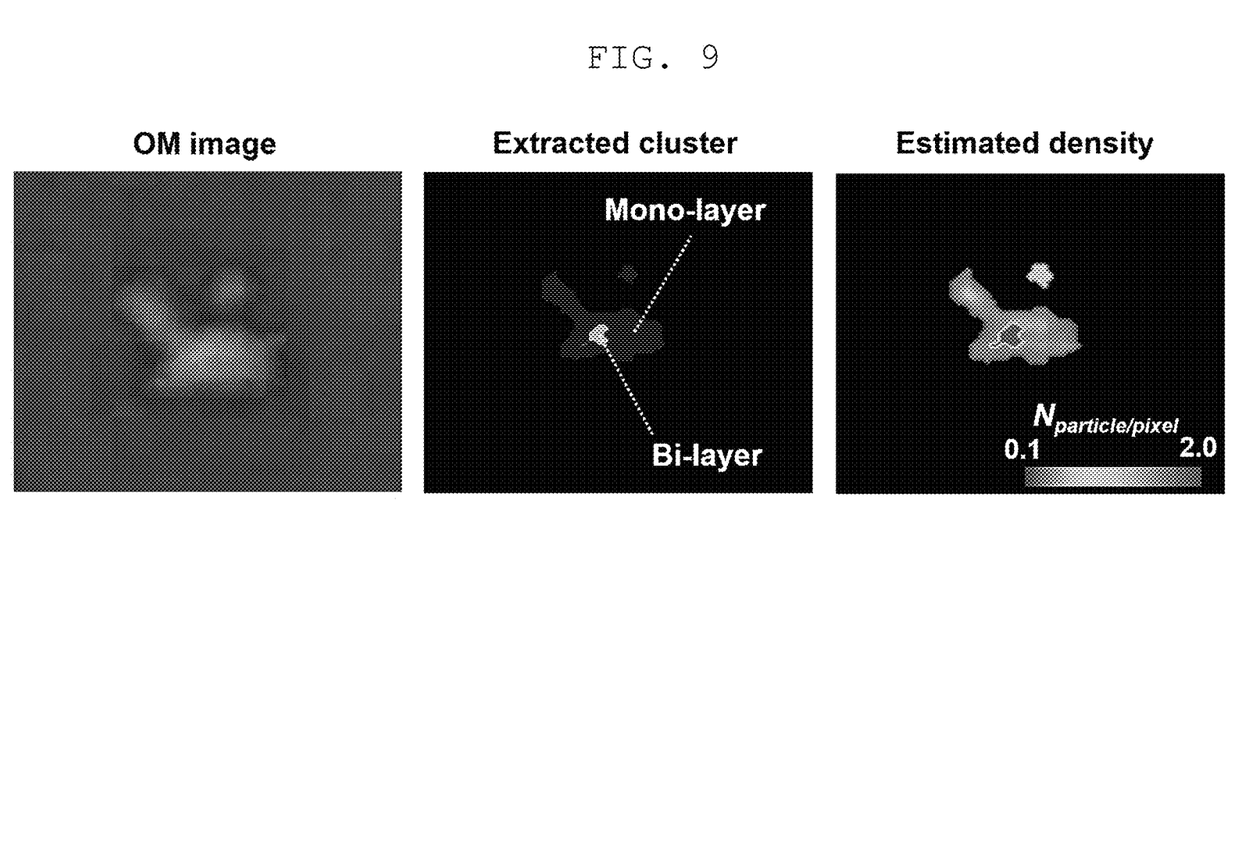
FIG. 9 is a view showing imaged arrangement state and density of viruses.

FIG. 8 is a view illustrating a process of determining whether there are multiple layers in a target analysis object and of imaging the arrangement in accordance with an image of the target analysis object and FIG. 9 is a view showing imaged arrangement state and density of viruses.

Referring to FIG. 1, a virus detection method according to an embodiment of the present disclosure may include: creating an RGB color data seat of a virus detector according to virus density (S10); taking an image of the virus detector reacting to a target analysis object (S20); recognizing a saturation value of the image (S30); determining whether viruses are arranged in multiple layers and density of the viruses in the target analysis object on the basis of the saturation value (S41 and S42); and imaging the arrangement state and density of the viruses (S50).

However, the virus detection method shown in FIG. 1 is based on an embodiment, the steps of the present disclosure are not limited to the embodiment shown in FIG. 1, and if necessary, some steps may be added, changed, or removed.

Referring to FIG. 2, the steps shown in FIG. 1 can be performed by a virus detection system and the virus detection system may include a detector 100, an optical instrument 200, and a processor 300. However, the virus detection system shown in FIG. 2 is based on an embodiment, the components thereof are not limited to the embodiment shown in FIG. 2, and if necessary, some components may be added, changed, or removed.

The optical instrument 200 and the processor 300, as shown in FIG. 2, may be physically connected, and can transmit and receive signals to and from each other through data communication at the positions separated in this way. Meanwhile, the optical instrument 200 and the processor 300, in order to perform operations to be described below, may include at least one physical element of application specific integrated circuits (ASICs), digital signal processors (DSPs), digital signal processing devices (DSPDs), programmable logic devices (PLDs), field programmable gate arrays (FPGAs), a controller, and a micro-controller.

Hereafter, process of performing the steps shown in FIG. 1 by means of the components shown in FIG. 2 are described, and a virus detector 100 that is used in the virus detection system is described first before detailed description of the steps.

Referring to FIG. 3, in the present disclosure, the virus detector 100 may include a reflective layer 110 including metal, a resonant layer 120 formed on the reflective layer 110, an antibody immobilization layer 140 positioned on the resonant layer 120 and immobilizing antibodies, and an antibody layer 150 formed on the antibody immobilization layer 140. In addition, the virus detector 100 may further include a buffer layer 130 formed between the resonant layer 120 and the antibody immobilization layer 140.

The reflective layer 110 may be made of a material that reflects light, and in detail, may include metal having a high light reflectivity. For example, the reflective layer 110 may be made of at least one of gold, silver, aluminum (Al), titanium (Ti), platinum (Pt), chrome (Cr), and copper (Cu). The reflective layer 110 may be implemented in an ultra thin film type and may have a thickness of 200 nm or less.

The resonant layer 120 may be made of a dielectric substance that is a porous semiconductor substance having an extinction coefficient and has light absorbance. For example, the resonant layer 120 may be made of at least one of germanium (Ge) and amorphous silicon (a-Si). The resonant layer 120 may also be implemented in an ultra thin film type, and in detail, may be formed thinner than the reflective layer 110.

The resonant layer 120 may be deposited on the reflective layer 110, and for example, may be formed on the reflective layer through oblique angle deposition. In this case, porosity of the resonant layer 120 may be adjusted in accordance with the deposition angle and the thickness of the resonant layer 120 may be adjusted in accordance with the deposition time.

The surface cooler of the virus detector 100 may change in accordance with variation of the porosity and thickness of the resonant layer 120. In detail, variation of the porosity and thickness of the resonant layer 120 may generate refractive index variation of the resonant layer 120 and the variation of refractive index may cause a color change. Accordingly, the basic color of the surface of the virus detector 100 may be determined in accordance with the porosity and thickness of the resonant layer 120 in the present disclosure.

Meanwhile, the buffer layer 130 may be formed on the resonant layer 120. However, the buffer layer 130 is a component for protecting the resonant layer 120, so it may be omitted. The buffer layer 130 is made of an oxide (e.g., silicon dioxide ($SiO_2$)), so it can protect the resonant layer 120 from external water or moisture.

The antibody immobilization layer 140 that immobilizes antibodies may be formed on the resonant layer 120 or the buffer layer 130. The antibody immobilization layer 140 may be coated on the resonant layer 120 or the buffer layer 130 and may be bonded with antibodies. The antibody immobilization layer may be made of polyethylene glycol (PEG) and may be made of a polymer (e.g., glutaraldehyde) having a functional group that can be bonded with an amino group of an antibody.

The antibody layer 150 may be formed on the antibody immobilization layer 140. The antibody layer 150 may be composed of a plurality of antibodies and the antibodies can adhere to the antibody immobilization layer 140. In detail, antibodies can adhere to the surface of the antibody immobilization layer 140 by applying an antibody solution to the antibody immobilization layer 140.

The buffer layer 130, the antibody immobilization layer 140, and the antibody layer 150 described above may have a thickness of tens of nanometers or less. Accordingly, the virus detector 100 can have a flexible ultra thin structure and can be produced to have a large area. Due to this structural characteristic, the virus detector 100 can be applied to daily products such as a mask, clothing, a wearable patch, etc.

Referring to FIG. 4, a virus 10 that the virus detector 100 of the present disclosure can sense may be a corona virus (SARS-CoV-2), but is not limited thereto and a certain virus 10 that can be bonded with the antibody layer 150 described above may be a sensing object.

Membrane proteins 11 may be formed like projections on the surface of the virus 10, and when the virus 10 is a corona virus, the membrane proteins 11 may be spike proteins. The membrane proteins 11 can generate an antigen-antibody interaction with the antibody layer 150. In detail, the membrane protein 11 is bonded with the antibody layer 150 and the color at the joint between the membrane protein 11 and the antibody layer 150 on the surface of the virus detector 100 may change.

Meanwhile, the structure of the virus detector 100 that is used in the present disclosure was described above by exemplifying FIGS. 3 and 4, but various kinds of virus detectors 100 that are used for a colorimetric sensor may be used in the present disclosure.

The processor 300 of the present disclosure can create in advance an RGB color set of the virus detector 100 according to density of viruses 10 in consideration of the color change feature described above. In this case, the density may depend on the distance between viruses 10 and/or the number of arrangement layers of viruses, as will be described below.

Referring to FIG. 5, the color of the virus detector 100 may change into another color, depending on the distance $D_{gap}$ between viruses 10 being in contact with the virus detector 100. In detail, the reflection spectrum of the virus detector 100 may depend on the distance between viruses 10, and accordingly, the color of the virus detector 100 may change into different colors, depending on the distance between viruses 10.

Further, the color of the virus detector 100 may change into another color, depending on also the number of arrangement layers of viruses 10 being in contact with the virus detector 100. For example, as shown in FIG. 5, when viruses 10 being in contact with the virus detector 100 are arranged in a monolayer and a bilayer, the reflection spectrum of the virus detector 100 may be different.

Referring to FIG. 6, as shown in the graph G1, when viruses are arranged in a monolayer, reflectivity according to the filling fraction and the wavelength of the viruses 10 may be observed as showing a minimum value in any one section. However, as shown in the graph G2, when viruses 10 are arranged in a bilayer, reflectivity according to the filling fraction and the wavelength of the viruses 10 may be observed as showing a minimum value in two sections.

Due to this difference in reflection spectrum, the color of the virus detector 100 may change into another color, depending on not only the distance between viruses 10 being in contact with the virus detector 100, but the number of arrangement layers. Only the cases in which viruses 10 are arranged in a monolayer and a bilayer were exemplified in FIGS. 5 and 6, but even though viruses 10 are arranged in triple layers, the color of the virus detector 100 can change into another color, depending on the number of arrangement layers of the viruses 10.

Referring to FIG. 5 again, when the positions of viruses 10 are set in advance through simulation, the optical instrument 200 can image RGB colors of the virus detector 100 that are observed for density $N_{particle}$ of each virus 10. The processor 300 can configure the RGB colors corresponding to the density into a dataset and can keep the dataset in a database (memory).

When a database finishes being constructed, the virus detection system can determine whether viruses 10 are arranged in multiple layers and density of the viruses 10 in a target analysis object 20 by analyzing the target analysis object 20. In this case, the target analysis object 20 is an object substance for analysis about whether viruses 10 are included therein, and for example, may be a body fluid such as saliva, blood, etc.

First, the optical instrument 200 can take an image of the virus detector 100 reacting to the target analysis object 20 (S20). In detail, when the target analysis object 20 is applied to the top of the virus detector 100, the virus detector 100 can generate an antigen-antibody interaction with viruses 10 in the target analysis object 20. Accordingly, the cooler of the virus detector 100 can change and the optical instrument 200 can take an image of the virus detector 100 having the changed color.

Meanwhile, as shown in FIG. 2, the virus detector 100 may have a specification of a 1 mm width and a 1 mm length and may include a plurality of pixels arranged in a lattice shape. The optical instrument 200 can take an image by scanning the virus detector 10 at each pixel, and to this end, the optical instrument 200 may include a screening microscope and a Charge Coupled Device (CCD).

When an image is taken, the processor can recognize the saturation value of the taken image (S30) and can determine whether the viruses 10 are arranged in multiple layers and density of the viruses in the target analysis object 20 on the basis of the saturation value (S41 and S42).

Referring to FIG. 7, images taken by the optical instrument 200 may be represented as RGB colors. The processor 300 can recognize a saturation value of an image by changing the RGB colors of pixels constituting the image into saturation. In detail, the processor 300 can recognize a saturation value by converting the RGB color values of pixels into Hue, Saturation, Value (HSV)

Meanwhile, in order to improve operating efficiency, the processor 300 can recognize a saturation value only at portions where a color changed in the virus detector 100.

In detail, the processor 300 can cluster pixels of which the color value or the saturation value is in a preset range of pixels constituting an image, and can recognize only the saturation values of the clustered pixels.

Referring to FIG. 8, as described above, the virus detector 100 may have basic RGB colors in accordance with the structure of the resonant layer 120. The RGB colors of the virus detector 100 change only at portions reacting with viruses 10 in the target analysis object 20, and the changed RGB color values and saturation values converted on the basis of the RGB color values may have values within preset ranges.

Accordingly, the processor 300 can discriminate first a clustering region and a substrate region by clustering only pixels of which the color value and the saturation value are within preset ranges, and can selectively recognize only the saturation values of the pixels in the clustering region.

When saturation values are recognized in accordance with the method, the processor 300 can determine whether the viruses 10 are arranged in multiple layers and density of the viruses 10 in the target analysis object 20 on the basis of the saturation values. First, a method of determining whether viruses 10 are arranged in multiple layers by means of the processor 300 is described.

As described above with reference to FIG. 6, the reflection spectrum of the virus detector 100 may be completely different, depending on whether viruses 10 are arranged in a monolayer or a bilayer on the virus detector 100. In this case, the color of the virus detector 100 is represented linearly regardless of whether the viruses 10 are arranged in multiple layers, but the saturation of the virus detector 100 may be completely differently represented, depending on whether the viruses 10 are arranged in multiple layer.

In detail, as shown in FIG. 7, the color of the virus detector 100, for example, the RGB color values or the Hue value may be included in a specific linearly continuous section regardless of whether the viruses 10 are arranged in multiple layers in the target analysis object 20. However, the saturation value of the virus detector 100 may be included in a completely different section, depending on whether the viruses 10 are arranged in multiple layers. In detail, the saturation value range when viruses 10 are arranged in a monolayer is completely separated from the saturation value range when viruses 10 are arranged a bilayer, so they may not overlap each other.

Accordingly, the processor 300 can determine whether the viruses 10 are arranged in multiple layers in accordance with whether saturation values recognized at pixels are included in a plurality of reference ranges that do not overlap each other. Referring to FIG. 7, the processor 300 can determine that viruses 10 are arranged in a monolayer when saturation values of pixels are included in a first reference range and can determine that viruses 10 are arranged in a bilayer when saturation values are included in a second reference range lower than the first reference range. In this case, the first reference range and the second reference range may not overlap each other.

Next, a method of determining density of viruses 10 by means of the processor 300 is described.

As described above with reference to FIG. 5, density $N_{particle}$ of viruses 10 may be determined in accordance with the distance between the viruses 10 and whether the viruses 10 are arranged in multiple layers, and the RGB color dataset of the virus detector 100 according to the density of the viruses 10 may be stored in advance in a database.

The processor 300 can convert the RGB color dataset for density stored in the database into a saturation dataset for density, and can recognize saturation data corresponding to the saturation value of the virus detector 100 reacting with the target analysis object 20. Next, the processor 300 can determine a density value corresponding to the saturation data as density of the viruses 10

As shown in FIG. 7, density of viruses 10 may inversely proportional to a saturation value regardless of whether the viruses 10 are arranged in multiple layers, and the lower the saturation value, the higher the processor 300 can determine the density of the viruses 10.

When whether the viruses 10 are arranged in multiple layers and density of the viruses 10 are determined in accordance with the method described above, the processor 300 can image the arrangement state and density of the viruses 10.

Referring to FIG. 8, the processor 300 can determine the arrangement state and density of viruses 10 in a clustering region and can image the arrangement state and density. In detail, the processor 300 can separately image clustering regions, depending on whether viruses 10 are arranged in a monolayer or a bilayer. Further, the processor 300 can create an analysis image in which the colors of pixels constituting the clustering region are differently represented, depending on the density of the viruses 10.

Referring to FIG. 9, the processor 300 can create an analysis image in which the colors of pixels constituting the clustering region are represented in a binary type, depending on whether the viruses 10 are arranged in multiple layers (monolayer, bi-layer). Further, the processor 300 can create an analysis image in which the colors of pixels constituting the clustering region are linearly represented, depending on the density of the viruses 10.

As described above, the present disclosure has an advantage that it is possible to not only intuitively find out whether an examinee has been infected with viruses 10 through a quick examination, but find only the degree of infection with the viruses 10 by detecting the arrangement state and density of the viruses 10 included in a target analysis object 20 using a color change of a virus detector 100 reacting with the target analysis object 20.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be expected from the configuration should be also admitted.

What is claimed is:

1. A virus detection method comprising:
    taking an image of a virus detector reacting with a target analysis object;
    determining whether viruses in the target analysis object are arranged in a monolayer or multiple layers, based on a saturation value of the image, by performing:
        determining that the viruses are arranged in the monolayer when the saturation value is included in a first reference range; and
        determining that the viruses are arranged in the multiple layers when the saturation value is included in a second reference range that is lower than the first reference range; and
    determining density of the viruses in the target analysis object, based on the saturation value of the image, and based on a saturation dataset storing information on a density value corresponding to the saturation value, wherein in the saturation dataset, the density value is inversely proportional to the saturation value regardless of whether the viruses are arranged in the monolayer or the multiple layers.

2. The virus detection method of claim 1, wherein when the virus detector comes in contact with a virus, a color thereof changes through an antigen-antibody interaction.

3. The virus detection method of claim 1, wherein the virus detector includes:
    a reflective layer including metal;
    a resonant layer formed on the reflective layer;
    an antibody immobilization layer positioned on the resonant layer and immobilizing antibodies; and
    an antibody layer formed on the antibody immobilization layer.

4. The virus detection method of claim 1, wherein the taking the image comprises: taking the image by scanning the virus detector at each pixel.

5. The virus detection method of claim 1, further comprising creating an RGB color dataset of the virus detector according to the density of viruses.

6. The virus detection method of claim 1, wherein the taking the image comprises:
    converting an RGB color value of the image into the saturation value.

7. The virus detection method of claim 1, wherein the taking the image comprises:
    clustering pixels of which a color value or the saturation value is in a preset range of pixels constituting the image; and
    calculating the saturation values of the clustered pixels as the saturation value of the image.

8. The virus detection method of claim 1, further comprising imaging an arrangement state and the density of the viruses.

9. The virus detection method of claim 8, wherein the imaging comprises: creating an analysis image in which colors of pixels constituting the image are differently represented, depending on at least one whether the viruses are arranged in the monolayer or the multiple layers, and the density of the viruses.

* * * * *